Sept. 7, 1965          D. W. COGSWELL          3,204,485
STATIC AND DYNAMIC TORQUE CONTROLLER
Filed Dec. 10, 1962          6 Sheets-Sheet 2
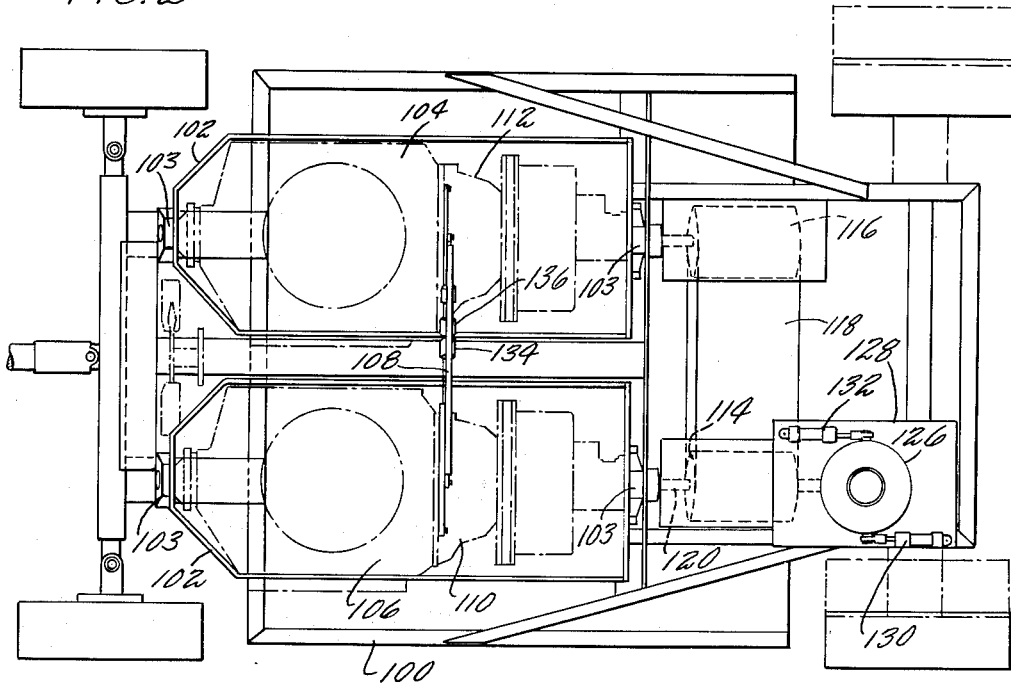
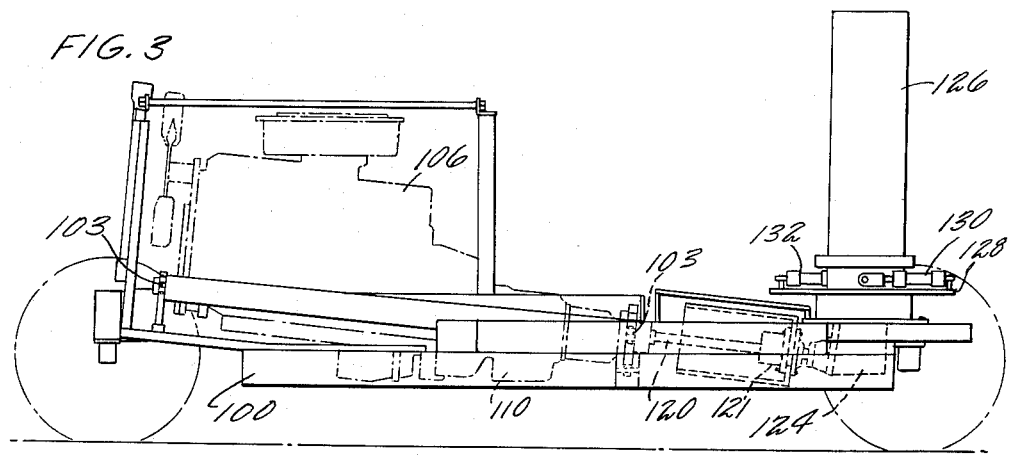
INVENTOR
DAVID W. COGSWELL
BY Norman Friedland
AGENT

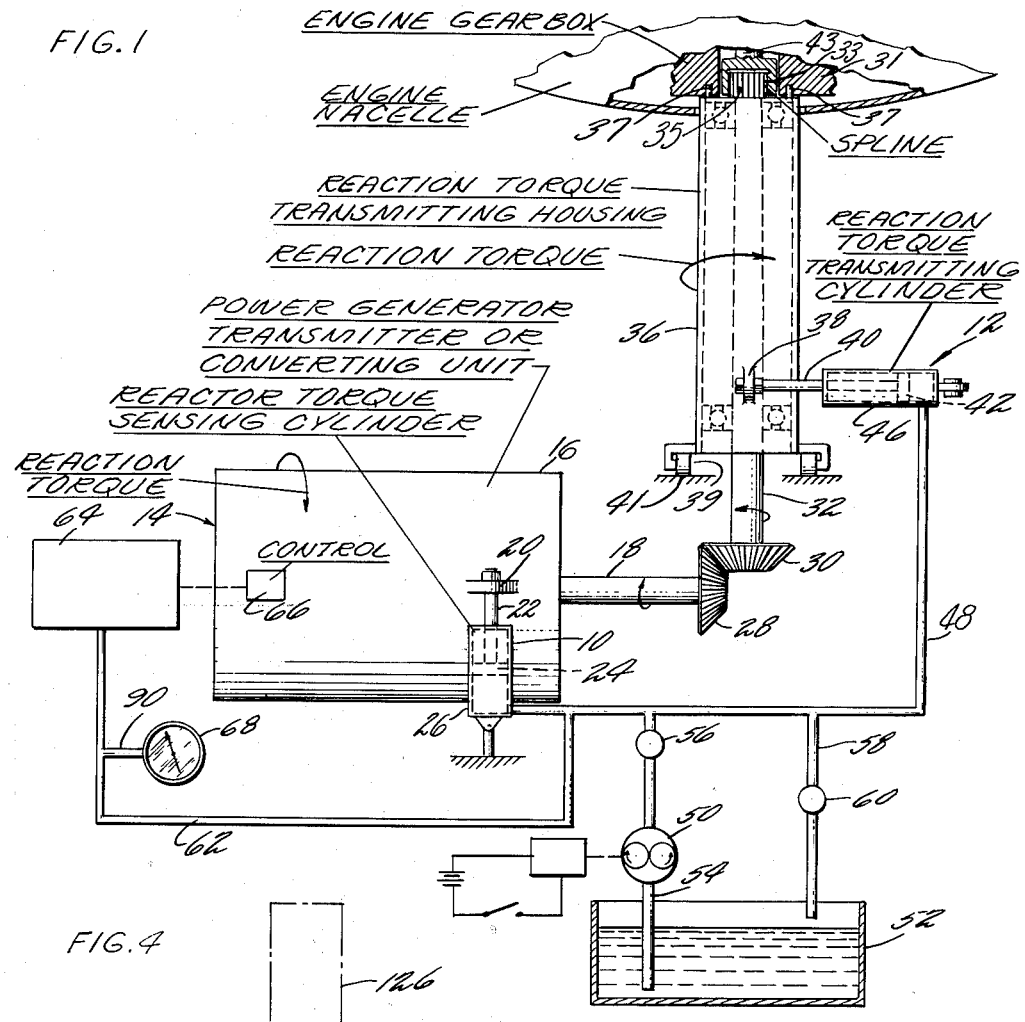

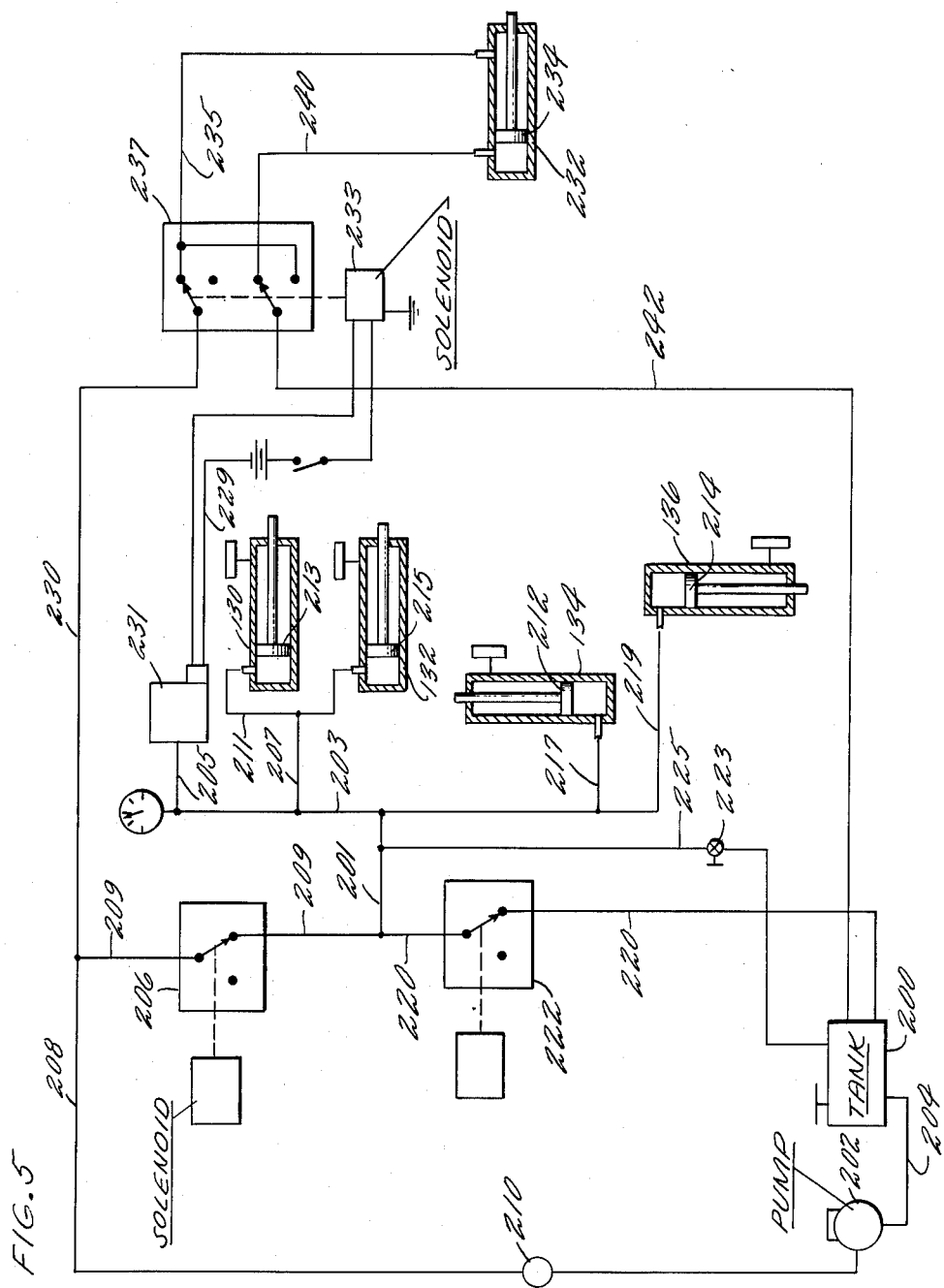

Sept. 7, 1965 D. W. COGSWELL 3,204,485
STATIC AND DYNAMIC TORQUE CONTROLLER
Filed Dec. 10, 1962 6 Sheets-Sheet 4

INVENTOR
DAVID W. COGSWELL
BY Norman Friedland
AGENT

Sept. 7, 1965 D. W. COGSWELL 3,204,485
STATIC AND DYNAMIC TORQUE CONTROLLER
Filed Dec. 10, 1962 6 Sheets-Sheet 5

INVENTOR
DAVID W. COGSWELL
BY Norman Friedland
AGENT

Sept. 7, 1965      D. W. COGSWELL      3,204,485
STATIC AND DYNAMIC TORQUE CONTROLLER
Filed Dec. 10, 1962      6 Sheets-Sheet 6
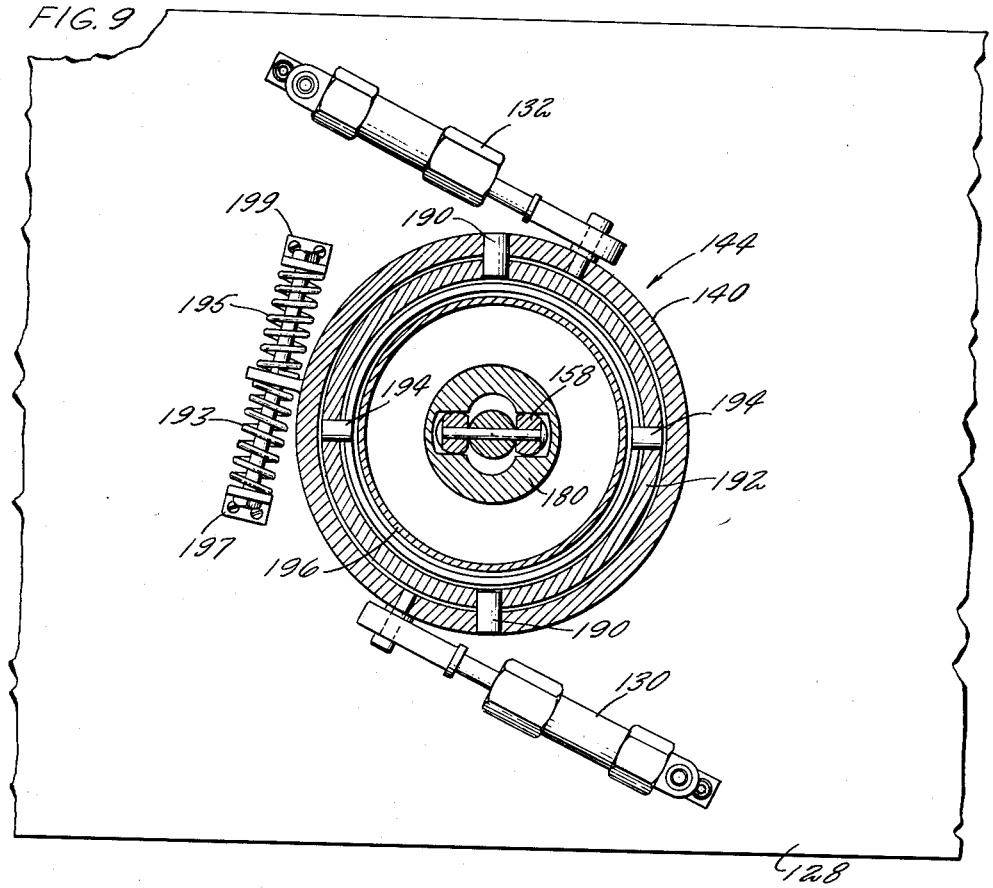
INVENTOR
DAVID W. COGSWELL
BY Norman Friedland
AGENT

United States Patent Office 3,204,485
Patented Sept. 7, 1965

3,204,485
STATIC AND DYNAMIC TORQUE
CONTROLLER
David W. Cogswell, West Springfield, Mass., assignor to United Aircraft Corporation, East Hartford, Conn., a corporation of Delaware
Filed Dec. 10, 1962, Ser. No. 243,476
15 Claims. (Cl. 74—665)

This invention relates to power devices and particularly to means for controlling the static and dynamic torque produced by rotating machines, which machines may include power generators, power converters or power transmitters.

As is well known in the art, any rotating device when rotated to produce, convert or change direction of torque produces a reaction torque which is opposite in sense or direction but equal in magnitude to the torque produced by the rotating power output of the device. In devices where the reaction torque reaches any significant value it is customary to provide means for grounding the force produced thereby by mechanically linking the rotating machinery to some sturdy supporting members. By this mode the reaction torque produced by the rotating members is transmitted to the supporting structure and obviously, in machinery that produces high torque, the supporting members must be made strong enough to withstand this force. Consequently, this requires heavy supporting structure.

The problem of accommodating reaction torque becomes an even more increasing problem where it is desirable to transmit a positive or dynamic torque from one independent power system to another independent power system, each system being movable independently of each other. As for example, but in no means by way of limitation, a ground cart starter for starting a remotely mounted aircraft engine is illustrative of such a system. A ground cart starter generally contains its own power producing mechanism which drives suitable shafts for driving gears coupled to the engine of an aircraft. As torque is delivered from the starter through the various shafts, two effects are evident: First, the reaction torque produced by the starter engine has a tendency to rotate the ground cart supporting mechanism around the axes of the rotating shafts and second, the reaction torque of the shaft leading into the engine has a tendency to rotate the aircraft about that shaft's rotating axis.

It is therefore an object of this invention to obviate this tendency enumerated above by providing a system as described for canceling the reaction torque so that there will be a substantially zero net torque imposed on the ground cart supporting mechanism as well as the aircraft structure.

A further feature of this invention is to provide a reaction torque cancellation system which allows the use of lighter weight supporting structure.

It still is a further object of this invention to provide a hydraulic or pneumatic system responsive to the reaction torque generated by a rotating power device and the hydraulic or pneumatic system responsive to the rotating receiving device driven by the power device and including a hydraulic or pneumatic cylinder for absorbing the reaction torque developed by both of these devices.

It still is a further object of this invention to provide in a system as described means for sensing the reaction torque delivered by the rotating power device for ultimate use of this signal. Since the reaction torque is equal in magnitude to the torque being developed by the rotating power device, such a torque signal is substantially equal to the positive torque being generated by this power device and this signal may be utilized to indicate torque, schedule torque, limit torque and the like. In a device, which speed is also sensed or held constant, such a torque signal will indicate power which may likewise be used for control purposes.

A still further object of this invention is to provide mechanism for transmitting rotary motion from one independent power system to a second independent power system.

Other features and advantages will be apparent from the specification and claims and from the accompanying drawings which illustrate an embodiment of the invention.

FIG. 1 is a schematic illustration of a reaction torque canceling system and illustrates the novel concept of this invention.

FIG. 2 is a top view of a ground cart starter which includes this invention.

FIG. 3 is a side elevation view of the ground cart starter.

FIG. 4 is an end view of the ground cart starter illustrating the connection of the reaction torque sensing hydraulic cylinders.

FIG. 5 is a hydraulic schematic illustrating the torque canceling system.

Figure 6:
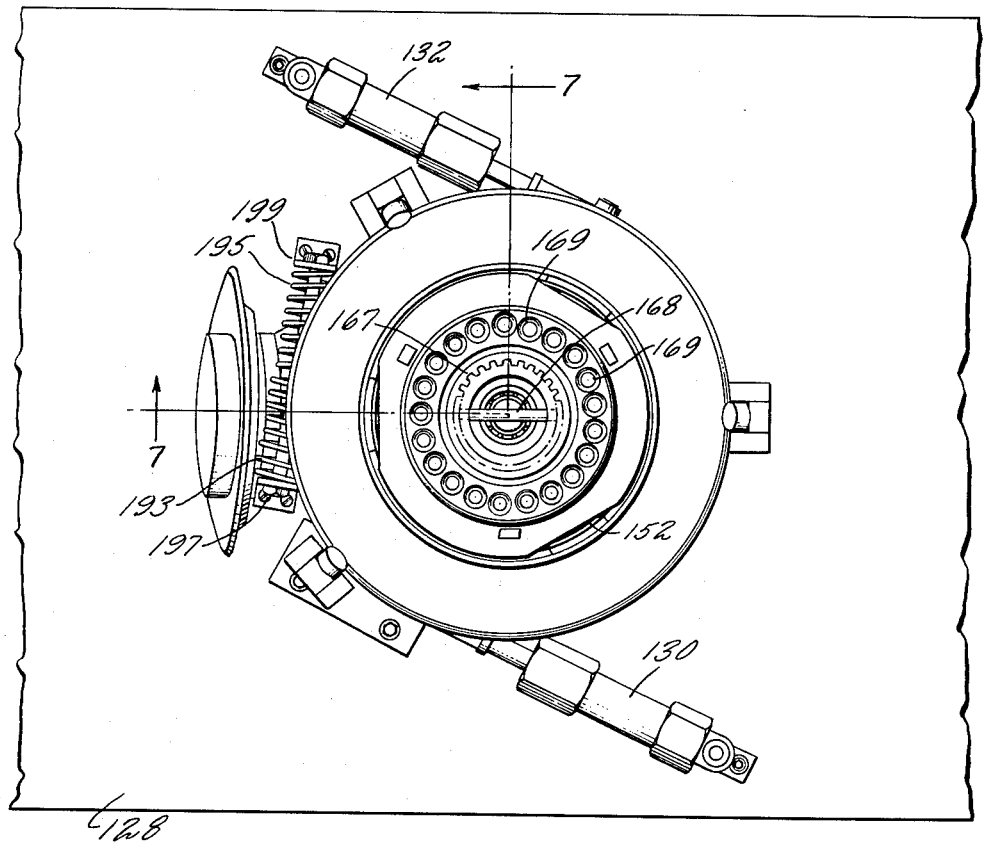
FIG. 6 is a top view of the telescoping probe shown in FIGS. 2 and 3.
Figure 8:
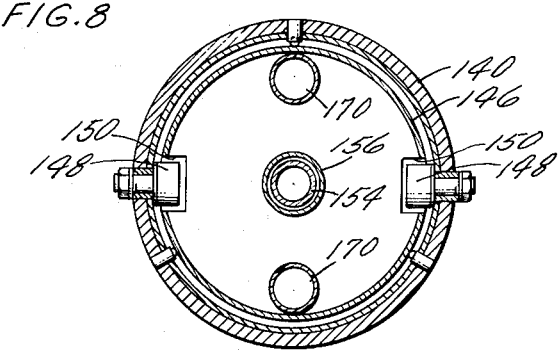
Figure 7:
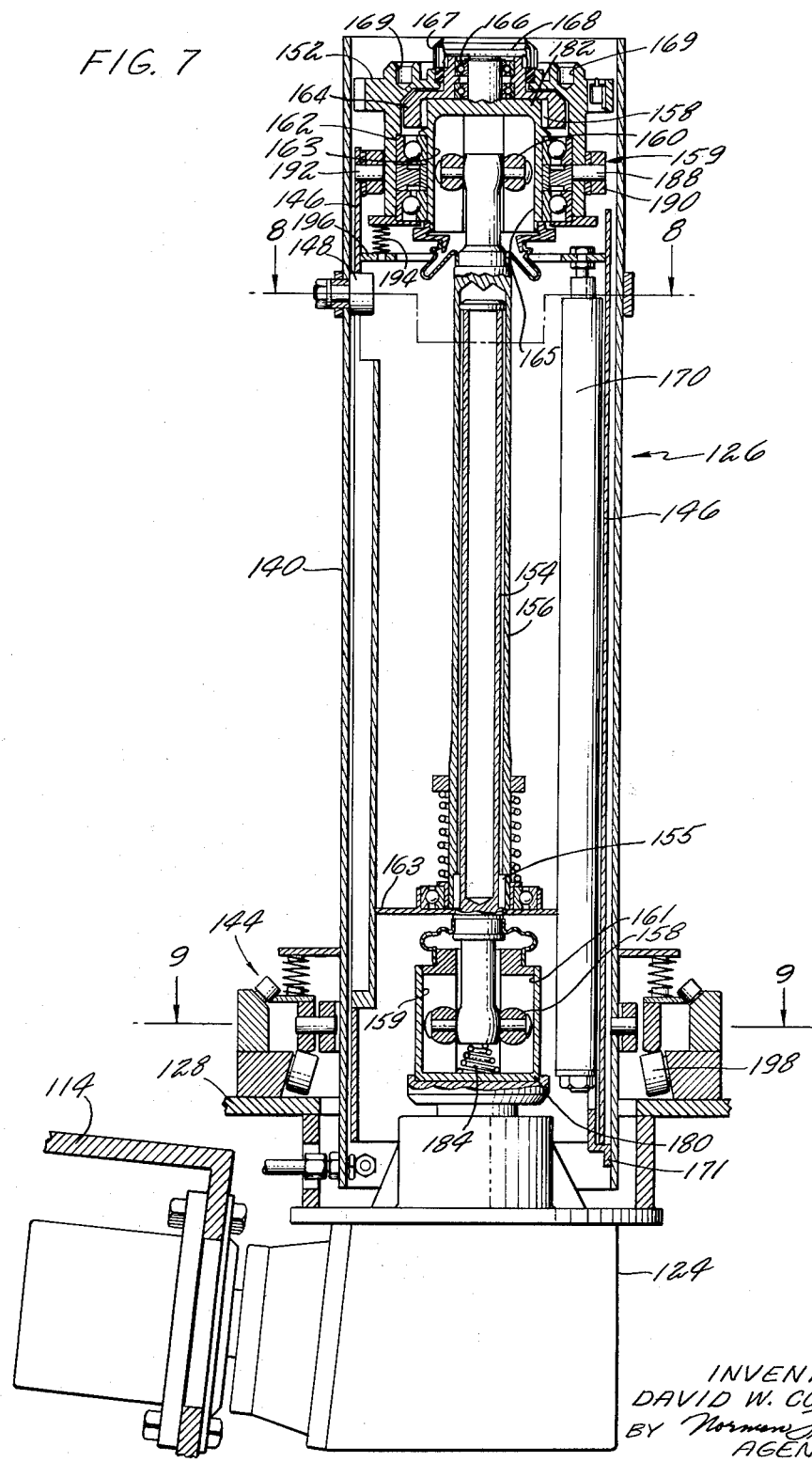

FIG. 7 is a section taken along lines 7—7 of FIG. 6.
FIG. 8 is a section taken along lines 8—8 of FIG. 7.
FIG. 9 is a section taken along lines 9—9 of FIG. 7.

Referring now to FIG. 1 which schematically shows the reaction torque system as comprising a reaction torque sensing cylinder generally indicated by numeral 10 and a reaction torque transmitting cylinder generally illustrated by numeral 12. Numeral 14 illustrates a rotating power device which may be a power generator, power transmitter, or a power converter. Such a device would include housing 16 which rotably supports shaft 18. As illustrated in the drawing, the shaft may be rotating in a clockwise direction. This develops a reaction torque in a counterclockwise direction which has the effect of tending to rotate the housing counterclockwise. Torque transmitting member 20 is attached to the housing and has one end attached to a connecting rod 22 which has its opposite end connected to a piston 24 disposed in the cylinder 26. The end of shaft 18 carries bevel gear 28 which meshes with bevel gear 30 for driving shaft 32. The driven shaft 32 may be coupled to engine gear box 31 by spline 33 mounted at end of shaft 43 which mates with spline 35 carried on the end of gear box shaft 32. An outer housing 36 supports or guides the rotating shaft and is also connected to and being restrained by pins 37 extending from the engine gear box 31. Housing 36 may be supported in any suitable manner, as for example, by rollers 39 sandwiched between the grounded plate member 41 and the housing. It will be appreciated that this arrangement allows rotational movement of the outside housing about its longitudinal axis. The driven shaft, as is noted from the drawing, is rotated in a clockwise direction, thus imposing a torque on the outside housing of the device being driven equal in magnitude to the dynamic torque, thus tending to rotate the entire device in a clockwise direction. A torque transmitting member 38 is secured to housing 36 and has a free end connected to connecting rod 40. Connecting rod 40 is in turn connected to a piston 42 disposed in cylinder 46. Cylinder 46 and cylinder 26 are connected to each other by a hydraulic or pneumatic line 48 and receive hydraulic fluid or air pressure on the under side of the pistons 24 and 42. The cylinders are hydraulically or pneumatically charged by driving pump 50 which is connected to the fluid containing reservoir 52 by line 54. A one-way check valve 56 is disposed in the line upstream of the pump, which allows the fluid to egress into line 48 but prevents the fluid from draining or leaking back to the pump. The pressure developed by the pump 50 is sufficient to completely fill the fluid line 48 and that portion of cylinders 24 and 46 defined by the pistons 24 and 42. Hence, it will be appreciated that piston 24 is hydraulically or pneumatically connected to piston 42. A drain line 58 is connected to the line 48 which serves to drain or release the fluid from the system upon actuation of valve 60, which may be operated either manually or automatically.

From the foregoing, it is apparent that when the system is fully charged and the power device 14 is rotating, the reaction torque sensed in reaction torque sensing cylinder 10 is transmitted to reaction torque canceling system 12. The reaction torque generated by virtue of device 14 and transmitted by housing 16, arm 20, sensor 10, line 48, transmitter 12, arm 38, housing 36 and pins 31 is equal in magnitude and opposite in direction to the torque transmitted by virtue of the shaft 32, thus canceling the net torque delivered to the powered device. Owing to the reaction torque canceling device, the reaction torque developed by unit 14 and the reaction torque developed by the driven shaft 32 substantially cancel each other so that the tendency of the housing 16 to rotate about the rotating axis of shaft 18 and the housing 36 to rotate about the rotating axis of shaft 32 is substantially eliminated. Thus, the net static torque on the device to which the housing 36 is attached is substantially eliminated.

Since the pressure in line 48 is substantially proportional to the reaction torque and since the reaction torque is equal to the magnitude of the torque of the rotating shaft 18, although opposite in direction, this pressure becomes a function of or proportional to the torque developed by the rotating device 14. By virtue of this arrangement, the pressure may be utilized to actuate any type of device which may be desirable for controlling the torque developed by the rotating device 14. For example, it may be desirable to limit the torque of the device 14 upon reaching a predetermined torque value. This may be done by bleeding pressure from line 48 through line 62 into the torque limiting device generally illustrated by numeral 64. The torque limiting device may consist of a hydraulic cylinder which positions a piston against a force therein proportional to the torque being developed. Mechanism (not shown) may be attached to the piston by suitable linkages (not shown) and schematically illustrated by numeral 66 to control the operating mechanism controlling the speed and/or torque of the power device 14. It may also be desirable to obtain a reading of the actual torque being developed which may be accomplished by using any suitable indicating device illustrated by numeral 68, which device is connected to the torque reaction system by line 99. Hence, the dial of the indicator can give a direct reading of the torque being developed by the system.

Reference is now made to FIGS. 2–9 which are exemplary showings of a preferred embodiment for which this invention may be utilized. While the example selected shows a ground cart starter for starting aircraft engines, it is to be understood that this invention is not limited thereto and as one skilled in the art will appreciate, this invention may be employed for any rotating device which delivers power to a second remotely mounted device. The ground cart starter comprises a frame generally indicated by numeral 100 rotatably supporting cradles generally indicated by numeral 102 which in turn support a pair of reciprocating engines 104 and 106. Each cradle may have either end journalled in a bearing member 103 projecting from and supported by the frame. As noted from the drawing, the frames carry suitable axles, wheels and towing mechanism for moving and aligning the power delivery probe 126 with the gear box of the aircraft engine. The reciprocating engines are mounted in the cradle and are tied together by tie rod 108 which allows the engines to rock in unison with respect to the frame. Each engine carries a torque converter 110 and 112, which delivers rotary motion to the probe gear box 124. The drive pulley members 114 and 116 are coupled together by endless belt 118 and they together with engine drive shaft 120 and universal joint 121 drive the gears in gear box 124. The gear box may contain any suitable gearing for transmitting rotary motion from shaft 120 and the pulleys to the substantially right angle mounted shafts inside of probe 126. Telescoping probe generally illustrated by numeral 126 extends at approximately right angles with the drive shaft 120. The details of the probe will be described hereinafter. Secured to the frame and mounted on the bottom of the probe is pad 128 which serves to support a pair of torque transmitting cylinders 130 and 132. The torque transmitting cylinders are hydraulically coupled to a pair of torque sensing cylinders 134 and 136. As is shown in the drawing, the torque sensing cylinders have either end connected to adjacent engines and are connected in such a manner that the longitudinal center line, when extended, lies in a plane that intersects the center line of the rotating axis of the adjacent engine. Thus, the center line of piston 136, when extended, intersects the center line of the rotating shaft of engine 106 and similarly, the center line of cylinder 134, when extended, intersects the center line of the rotating axis of the shaft of engine 104. In this manner, the reaction torque generated by each of the engines will not produce any moments about the center line of either of the engine shaft rotating axes.

Now referring to FIGS. 6–9 which show the details of the probe as comprising an outer torque tube 140 mounted to a thrust plate 128 by the spring loaded (for centering) lower gimbal assembly generally indicated by numeral 144. An inner torque tube 146, which is mounted adjacent to and coaxially with the outer tube, moves rectilinearly with respect thereto and is supported by torque tube rollers 148. Torque tube roller guides 150 are mounted on the inner torque tube in any suitable manner for guiding the torque tube along its predetermined travel. Spring loaded (again for centering) gimbal mounted to the inner torque tube is the probe head generally indicated by numeral 152. A telescoping shaft having an inner shaft member 154 and an outer shaft member 156 is suitably connected by the universal joint generally indicated by numeral 158 to the gear box. Both the inner shaft and the outer shaft are rotatably coupled by means of keys 155 for driving the upper universal joint 160 which in turn drives clutch inner race 182 and overrunning clutch 158. Probe head 152 is rotably supported by bearing 162 to inner race 182 which together form a cavity for receiving uper universal joint 160. The particular way of mounting the probe head to the universal joint is especially important because it allows the probe to be extended substantially twice its retracted length. The outer race 164 of overrunning clutch 158 is suitably supported by bearing 166. Spline member 167 for mating a spline in the gear box of the aircraft engine (not shown) may be attached to the outer race output shaft by shear pin 168, A plurality of pin receiving holes 169 are formed in the probe head which register with pins mounted on the gear box of the engine to be driven (not shown). A pair of hydraulic elevating cylinders 170 are supported on the outer torque tube through bracket 171 and are connected to plate member 196 for telescoping the inner torque tube 146 and the outer telescoping shaft 156.

Still referring to FIGS. 2–9, it will be appreciated that the gear box transmits rotary motion to the universal joint coupling member 180 for driving inner shaft 154 by way of universal joint 158. As noted from FIGS. 7 and 9, universal joint 158 is mounted in slots 159 and 161 formed in member 180 so that it may slide with respect thereto. Likewise, upper universal joint 160 may slide within the slots 163 and 165 formed in the inner race 182. As noted from FIG. 7, the center lines of the upper and lower universal joints are normally held in coincidence with the center lines of the trunnions of the upper and lower gimbals respectively and are held in this position by the spring 184 acting on the bottom of inner shaft 154. Even though the inner and outer shafts are frictionally locked when rotating, both shafts as a unit may be moved axially within the slots. This affords flexibility in the probe operation. Of course, spider 163 supporting outer shaft 156 is made flexible to deflect upon such motion.

In order to facilitate the alignment of the spline 167 with the spline mounted in the gear box of the aircraft engine (not shown), the probe may be angularly displaced with respect to gear box 124 and the probe head 152 may be angularly displaced with respect to the shaft and the torque tubes. However, it is important that probe head 152 maintain a vertical position even when angularly displaced. This is accomplished by the upper gimbals 159 and the cooperating centering spring mechanism which cmprise the trunnion 188 mounted on probe head 152. Trunnion 188 rotably supports gimbal ring 190 which carries suitable trunnions 192 mounted on the inner torque tube 146. A plurality of suitable compression srings 194 are disposed along the periphery of spider 196 and act against the under part of probe head 152 for holding the probe head in a vertical position.

As can be seen from FIG. 9, the probe is gimbal mounted to allow angular displacement with respect to the gear box 124. The gimbal comprises a pair of diametrically opposed trunnions 190 carried by the outer torque tube 140 which supports the inner gimbal ring 192. Gimbal ring 192 in turn carries a pair of diametrically opposed trunnions 194 spaced 90° from trunnions 190 which rotably support outer gimbal ring 196. The outer gimbal ring in turn is supported by the thrust rollers 198 (see FIG. 7) mounted on thrust plate 128. For convenience it will be noted from the drawings that the gimbals and their connections, shown in FIG. 7, are rotated from their actual position for the sake of clarity in order to simplify the explanation thereof.

From the foregoing it will be appreciated that owing to the gimbal mounting of the telescoping shaft with respect to the thrust plate and the probe head with respect to the outer torque tube and owing to the universal drive arrangement, the probe is capable of three dimensional movement. That is to say, the upper and lower torque tube may be oriented to be angularly displaced from the gear box and also be angularly displaced relative to the probe head. This enables the operator of the cart to match the spline of the probe with the spline of the engine, notwithstanding the fact that the ground cart starter might be in misalignment thereto.

As is apparent from the drawing, in FIG. 6 one end of each of the torque transmitting cylinders is attached to the outer torque tube. The other end of the torque transmitting cylinder, as can be seen in FIG. 2, is attached to the mounting pad 128. Each of the cylinders are mounted in opposing directions so as to impose a coupled force about the outer torque tube. Opposing compression springs 193 and 195 act against lug 197 and spring retaining members 199 and 201 respectively for torsionally centering the probe about the longitudinal axes. Spring retaining members 199 and 201 may be suitably mounted to pad 128. The reaction torque transmitting cylinders 130 and 132 and the reaction torque sensing cylinders 134 and 136 are hydraulically coupled to each other as will be explained in connection with the hydraulic flow diagram shown in FIG. 5.

Now referring to FIG. 5, it can be seen that hydraulic fluid is supplied from tank 200 to the pump 202 by hydraulic line 204. The fluid is conducted through charging valve 206 via line 208 and branch line 209 through the connecting branch lines 201, 203, 205, 207, 215, 217 and 219 and eventually to cylinders 130, 132, 134 and 136. A check valve 210 is placed in line 208 for preventing the fluid from flowing back to the pump, even though valve 206 may be closed. Upon charging the system, the pump and valve 206 may be shut off. It can be seen that all cylinders are hydraulically coupled to each other in such a manner as to avoid cavitation. Similar to the system explained in connection with FIG. 1, when the starter engines are rotating they generate reaction torque imparting a force on the pistons 212 and 214 in cylinders 134 and 136 respectively. The reaction torque developed by the starter engines is transmitted by these pistons to pistons 215 and 213 to the outer torque tube, which, in turn, is transmitted to the inner torque tube, to the probe head and then to the pins of the aircraft engine gear box (not shown) that register in the holes 169 (see FIGS. 6 and 7). Since the reaction forces generated by the starter engines are equal in magnitude but opposite in sense to the reaction torque generated by the engine to be started when driven by the drive spline, the net effect is to cancel each other out. In this manner no static or reaction force is transmitted to the structural pars of the airplane and similarly, no reaction force is transmitted to the frame and the attendant structural member of the ground cart starter.

To facilitate the connecting and disconnecting of the probe head, a draining system may be utilized. The draining system comprises drain line 220 which is connected to reservoir tank 200. To drain, automatically or manually operated valve 222 inserted in this line is opened and serves to drain the fluid from the respective cylinders. This unloads the cylinders and hence allows free movement of the probe head for engaging and disengaging the pins and the splines.

Manually operated bleed valve 223 disposed in line 225 may be opened to aid in bleeding air in the system to the vented reservoir tank 200. Also in accordance with the present invention, the torque limiter throttle control is connected to pressure line 208 of the reaction torque system by line 230. A suitable pressure sensing switch 231 is electrically connected by suitable conductor means 229 to solenoid 233. Cylinder 232 containing piston 234 responds to pump pressure delivered through valve 237. When valve 231 is opened fluid from line 230 is conducted through line 235 and into cylinder 232 to act on the right end of piston 234, the piston being connected to the controlling mechanism or throttle for the engine (not shown) so as to limit the torque. Fluid trapped in cylinder 232 on the left end of piston 234 is conducted to drain through line 240, valve 237, through line 242 and back to tank 200. When solenoid 233 is inactivated, the valve 237 is positioned to communicate the chamber adjacent to the right end of piston 234 with tank pressure. When the pressure in line 208 has reached a predetermined value which is proportional to the torque generated by the engine, switch 231 operates solenoid 233, and valve 237 so that piston 234 will be forced to move to reduce the throttle setting of the engines until torque falls sufficiently to reduce pressure in line 208 to allow switch 231 to open, thus changing valve 237 to reverse direction of pressure on piston 234 and thus allowing the throttles to reopen.

What has been shown by this invention is a system which is capable of sensing the reaction torque generated by the rotating device and applying that reaction torque to oppose the static torque applied to a driven member through its dynamic torque delivery system resulting in an overall canceling of the net torques. This system makes it unnecessary to provide heavy structural members which would otherwise be necessary to absorb the delivered torque or to absorb the generated reaction torque. In the case of aircraft starter application, it is obvious that the force otherwise imposed on the structural members of the aircraft is by virtue of this invention eliminated.

Another advantage of the system is that the pressure generated by the torque sensing system is made substantially proportional to the torque being developed and hence lends itself to being adapted for further utilization.

As for example, this pressure may actuate torque limiting devices, torque scheduling devices, torque indicating instruments and the like.

Also realized from this invention is a unique telescoping probe which compensates for any misalignment between the driven shaft and the probe head and the matching spline mounted on the aircraft engine driven thereby.

It is to be understood that the invention is not limited to the specific embodiment herein illustrated and described, but may be used in other ways without departing from its spirit.

I claim:

1. A device for transmitting rotation from one power system to another in which each power system has a reaction torque, the device including pressure developing means to resist the reaction torque of each of said systems and an interconnection between the means of the two systems such that the pressure developed by one means is balanced by the pressure developed by the other means.

2. A system for delivering rotary motion from one power device to a second remotely mounted independent power device comprising a rotating shaft driven by one of the power devices, a second shaft rotably driven by said rotating shaft, means responsive to the reaction torque developed in the driving said first shaft, means responsive to the reaction torque developed by said second shaft driving the second power device, reaction torque canceling means responsive to the reaction torque sensed by each of the means for canceling the reaction torque developed by said first shaft and said second shaft.

3. A device for transmitting rotation from one power system to another power system in which each power system has a reaction torque, the device including pressure developing means comprising a first piston having one end connected to the one power system, a second hydraulic piston connected to the other power system, connection means hydraulically connecting said first piston to said second piston said first and second pistons resisting the reaction torque of each of said systems so that the pressure developed by one means is balanced by the pressure developed by the other.

4. A device for transmitting rotational movement from one power system to another power system in which each power system has a reaction torque, the device including a hydraulic piston connected to the first power system and a hydraulic piston connected to the second power system, said first hydraulic piston and said second hydraulic piston being connected to the respective power systems in such a manner that each of the pistons tend to be moved in a direction that is equal to the direction of the reaction torque produced by each of the separate systems, and an interconnection between said first and second hydraulic pistons such that the pressure developed by said first hydraulic piston is balanced by the pressure developed by the second hydraulic pistons.

5. A device for transmitting rotation from one power system to another power system in which each power system has a reaction torque, a housing for each of the power systems, a first piston connected to one of said housings and a second piston connected to the other of said housing in such a manner that the movement of the piston is in a direction which is the same as the reaction torque developed by the respective systems, means for resisting reaction torque of each of the systems including an interconnection between the means for the two systems such that the pressure developed by one means is balanced by the pressure developed by the other means.

6. A device for transmitting rotation from one power system to another in which each power system has a reaction torque, the device including pressure developing hydraulic means to resist the reaction torque of each of said systems, a rotatbly mounted shaft on one said systems, a second shaft driven by said first shaft, a housing surrounding and supporting said second shaft and having means for engaging the second power system, said hydraulic means including a first piston connected to the first power means and a second piston connected to said housing and an interconnection between said first and second pistons such that the pressure developed by said one of the systems is balanced by the pressure developed by the other system.

7. A reaction torque canceling system for a first power system having a first rotating shaft and a second power system driven by said rotating shaft comprising a housing supporting said first rotating shaft, a first hydraulic cylinder including a piston contained therein having one end connected to said housing, a second hydraulic cylinder hydraulically coupled to said first hydraulic cylinder, and having a piston contained therein connected to said second power system so that each of said pistons respond to the reaction torque developed by said first power system and said second power system and said pistons being mounted with respect to each other so that the reaction force developed by each system imposes a force on each of said pistons which is opposite in sense from each other but equal in magnitude of the torque generated by each of the systems respectively, and means for admitting hydraulic fluid to said first and second hydraulic cylinders.

8. A system for transmitting torque from one power system to another power system in combination with apparatus for limiting the torque comprising a device including pressure developing means resisting the reaction torque of each of said systems, an interconnection between the means of the two systems such that the pressure developed by one means is balanced by the pressure developed by the other means, control means for controlling the torque of one of said power systems, and means responsive to the balanced pressure for controlling said control means.

9. A system for transmitting torque from one power system to another power system in combination with apparatus for limiting the torque comprising a device including presure developing means resisting the reaction torque of each of said systems, said developing means including a first piston and a second piston, an interconnection between said first piston and said second piston such that the pressure developed by said first piston is balanced by the pressure developed by said second piston, control means for controlling the torque of one of said power systems, and means responsive to the balanced pressure for controlling said control means.

10. A system for transmiting torque from one power system to another power system in combination with apparatus for limiting the torque comprising a device including pressure developing means resisting the reaction torque of each of said systems, said pressure developing means including a first cylinder having a piston disposed therein, which piston is connected to one system, a second cylinder having a piston disposed therein, which piston is connected with said other system, an interconnection between the said first cylinder and said second cylinder such that the pressure developed by the force of said first piston is balanced by the pressure developed by the force of said second piston, control means for controlling the torque of one of said power systems, and means including a piston and an interconnection between said third piston and said first piston responsive to the balanced pressure for controlling said control means.

11. Apparatus for ascertaining the value of torque developed by rotating machinery when driving a rotating device comprising, in combination, pressure responsive means including a first piston and a second piston resisting the reaction torque of the rotating machinery and the rotating device, interconnection means between the first and second piston and connected so that the presure developed by one means is balanced by the pressure developed by the other means, and pressure indicating means connected intermediate the first and second piston responsive to the balanced pressure.

12. Apparatus for transmitting rotary motion from one member to another remote member comprising, in combination, a telescoping elongated tube, a telescoping shaft rotatably mounted in said elongated tube, said shaft carrying radially extending driving members on one of its ends, a probe head, a gimbal for supporting said probe head to said elongated tube, said gimbal including radially extending trunnions interconnecting said probe head and said elongated tube, said trunninos being mounted so that their longitudinal axis when extended lies in the same plane as the longitudinal axis of said universal joint, means located in a bore formed in the probe head for receiving rotary motion from said telescoping shaft, means responsive to said one member transmitting the rotary motion for imparting rotary motion to said telescoping shaft, and means for imparting rectilinear motion to both said telescoping shaft and said telescoping elongated tube for engaging said remote member.

13. Telescoping apparatus for transmitting rotary motion from one member to a remote member comprising, in combination, a plate member, a telescoping shaft having a universal joint mounted on either end thereof, a telescoping casing surrounding said telescoping shaft and being gimbal mounted at its lower end to said plate member, a probe head gimbal mounted to said telescoping casing for engaging supporting structure for the member that is to receive the rotary motion, said probe head including an outer member having a bore formed therein, an inner race member rotatably mounted in said bore and surrounding one of said universal joints and having slots formed in its inner diameter for receiving said universal joint and being driven thereby, an outer race member rotatably mounted in said bore, a driving member secured to said outer race, and means between said inner race member and said outer race member for transmitting rotary motion from said inner race member to said outer race member, means for imparting rotary motion to said telescoping shaft for driving said driving member, and means for imparting rectilinear motion simultaneously to said telescoping shaft and said telescoping casing for engaging the remote member.

14. Apparatus for transmitting motion from one member to a remote member comprising, in combination, a plate member, an elongated telescoping tube, a first gimbal including trunnions interconnecting said plate member and said elongated telescoping tube, a telescoping shaft carrying a universal joint including radially extending arms mounted on either end thereof, a probe head, a second gimbal including trunnions interconnecting said probe head and one end of said elongated telescoping tube, said trunnions having longitudinal axes about which the elongated telescoping cases rotate, the axes of the trunnions of said first gimbal being mounted so that when extended intersect the axes of the radially extending arms mounted on one end of said telescoping shaft and the axes of the trunnions of said second gimbal being mounted so that when extended intersect the axes of the radially extending arms mounted on the other end of said telescoping shaft.

15. Apparatus for transmitting rotary motion from one member to another remote member comprising, in combination, a telescoping shaft carrying a universal joint on either end, driving means engaging one of said universal joints for imparting rotary motion to said telescoping shaft, a plate member, a telescoping casing gimbal mounted to one end of said casing surrounding said telescoping shaft, a probe head gimbal mounted to the other end of said casing, said probe head being restrained from rotating about the longitudinal axis of said telescoping shaft, said probe head having a bore completely surrounding one of said universal joints, an inner race member rotatably supported within said bore and having slots formed on its inner diameter for receiving said universal joint, an outer race member adjacent to said inner race member and rotatably supported thereby, a clutch member driven by said inner race member for driving said outer race member, a spline rigidly secured to said outer race member adapted to engage the member to be driven, said probe head having a series of holes formed in the top surface thereof for receiving pins formed in the supporting structure of the member to be driven, means for imparting rotary motion to said shaft, and means for simultaneously imparting rectilinear motion to said telescoping shaft and said telescoping casing.

References Cited by the Examiner
UNITED STATES PATENTS 969,162 9/10 Hodgkinson.
3,037,574 6/62 Clerk _____ 74—751 X DON A. WAITE, *Primary Examiner.*